(12) United States Patent
Dicke

(10) Patent No.: US 7,604,445 B1
(45) Date of Patent: Oct. 20, 2009

(54) COUNTERSUNK HEAD SCREW

(75) Inventor: Robert Dicke, Ennepetal (DE)

(73) Assignee: A-Z Ausrustung und Zubehor GmbH & Co. KG, Hattingen (DE)

( * ) Notice: Subject to any disclaimer, the term of this patent is extended or adjusted under 35 U.S.C. 154(b) by 0 days.

(21) Appl. No.: 09/958,164

(22) PCT Filed: Feb. 25, 2000

(86) PCT No.: PCT/EP00/01568

§ 371 (c)(1),
(2), (4) Date: Feb. 24, 2003

(87) PCT Pub. No.: WO00/61959

PCT Pub. Date: Oct. 19, 2000

(30) Foreign Application Priority Data

Apr. 7, 1999 (DE) .............................. 299 06 200 U

(51) Int. Cl.
*F16B 35/06* (2006.01)
(52) U.S. Cl. ...................................... 411/399; 411/188
(58) Field of Classification Search .................. 411/399, 411/188
See application file for complete search history.

(56) References Cited

U.S. PATENT DOCUMENTS

| | | | |
|---|---|---|---|
| 5,199,839 A | | 4/1993 | De Haitre |
| 5,205,694 A | * | 4/1993 | Nagoshi et al. ............. 411/399 |
| 5,249,882 A | * | 10/1993 | Nagoshi et al. ............. 411/399 |
| 5,772,376 A | * | 6/1998 | Konig ......................... 411/399 |
| 6,050,765 A | * | 4/2000 | McGovern et al. ....... 411/387.2 |
| 6,394,725 B1 | * | 5/2002 | Dicke ......................... 411/399 |
| 6,941,635 B2 | * | 9/2005 | Craven ..................... 29/525.11 |
| 2005/0226701 A1 | * | 10/2005 | Craven ....................... 411/399 |

FOREIGN PATENT DOCUMENTS

| | | |
|---|---|---|
| DE | 89 01 963 | 11/1989 |
| EP | 0 516 431 A1 | 12/1992 |
| GB | 997716 | 8/1967 |

* cited by examiner

*Primary Examiner*—Flemming Saether
(74) *Attorney, Agent, or Firm*—Brinks Hofer Gilson & Lione

(57) ABSTRACT

The invention relates to a countersunk head screw having a head (1), a shank (2) and a thread (3) extending at least partly over the shank (2). The head (1) has a bearing surface (4), narrowing in the direction of the shank (2), and a basic contour (5) which converges at a first angle ($\alpha$) in a first head section (5a) remote from the shank (2) and at a second, smaller angle ($\beta$) in a second head section (5b) facing the shank (2). In order to avoid, for example, undesirable deformations, splintering, tearing or the like, provision is made for friction ribs (6) to be arranged in the region of the bearing surface (4), and these friction rigs (6) extend over the two head sections (5a, 5b) and, with their outer edges (K), follow the converging basic contour (5) of the head (1), so that in each case the first edge section (6a), lying in the region of the first head section (5a), and a second edge section (6b), lying in the region of the second head section (5b), of the outer edges (K) of the friction ribs (6) enclose an obtuse angle ($\gamma$) with one another. The bearing surface (4) is set back radially in the direction of the shank (2) relative to the converging basic contour (5) of the head (1).

14 Claims, 2 Drawing Sheets

COUNTERSUNK HEAD SCREW

Figure 1:
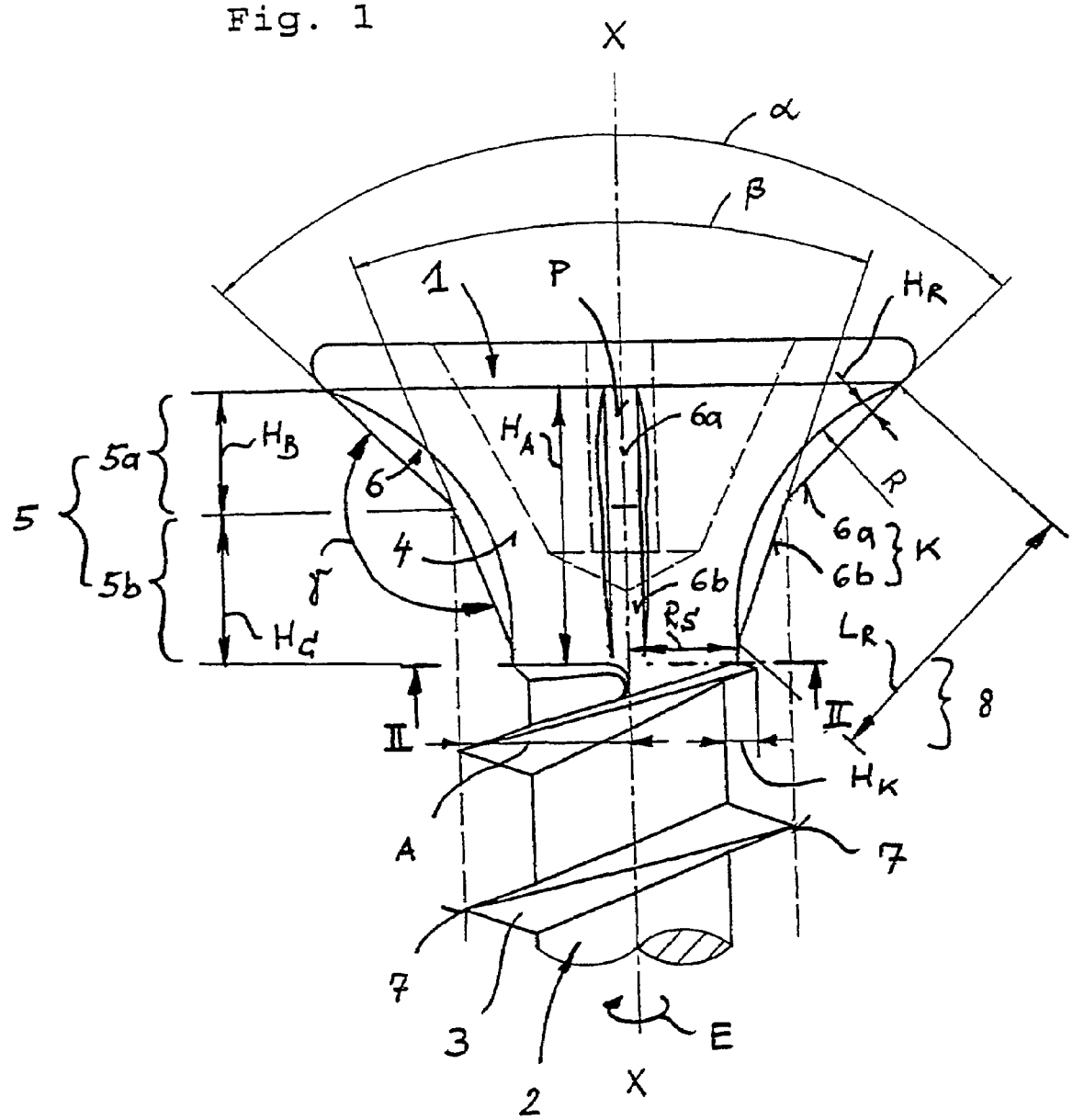

The invention relates to a countersunk head screw having a head, a shank and a thread extending at least partly over the shank, the head having a bearing surface, narrowing in the direction of the shank, and a first head section remote from the shank and at a second, smaller angle of about in a second head section facing the shank.

Such countersunk head screws are known. They may have, for example, a driving recess in the head, such as a slot or a cross recess, for the engagement of a screwdriver. The free shank end may be designed as a point. In particular, the countersunk head screws may be ones which exert a thread-forming or thread-cutting effect on the material into which they are screwed. So that there is sufficient space for a driving recess in the head, the latter must be designed to be appropriately voluminous. In order to achieve this, two different head sections are provided for the bearing surface tapering conically in the direction of the shank, in which head sections the bearing surface converges at different angles. It is known in this case that the first angle is preferably about 90° and the second angle is preferably about 40° to 60°.

Since no thread is provided at the head, the problem may arise that undesirable destruction of the material occurs, in particular at the surface, such as, depending on the type of material, splintering, tearing or undesirable deformation, by screwing with a voluminous countersunk head, after it has been screwed in completely or almost completely.

The object of the invention is to improve a countersunk head screw of the type described at the beginning in such a way that the adverse phenomena mentioned above can be avoided.

The object of the invention is achieved by a countersunk head screw of the type mentioned at the beginning in which friction ribs are arranged in the region of the bearing surface, and these friction ribs extend over the two head sections and, with their outer edges, follow the converging basic contour of the head, so that in each case a first edge section, lying in the region of the first head section, and a second edge section, lying in the region of the second head section, of the outer edges of the friction ribs enclose an obtuse angle with one another, the bearing surface being set back radially in the direction of the shank relative to the converging basic contour of the head.

Compared with a conventional screw, reduced destruction of the material, in particular a smaller splitting effect is achieved by the countersunk head screw according to the invention, in particular when screwing into soft material, such as wood. Owing to the fact that the bearing surface is set back radially in the direction of the shank relative to the converging basic contour of the head, the displacement of material is also minimized when the screw is being screwed in, since the volume of the head is smaller than in the known screw. However, despite the presence of a slot and despite the less voluminous design of the head, sufficiently high strength of the countersunk head screw according to the invention can be ensured in its head region by the stabilizing effect of the friction ribs.

Further advantageous design features of the invention are contained in the subclaims and the description below.

Figure 2:
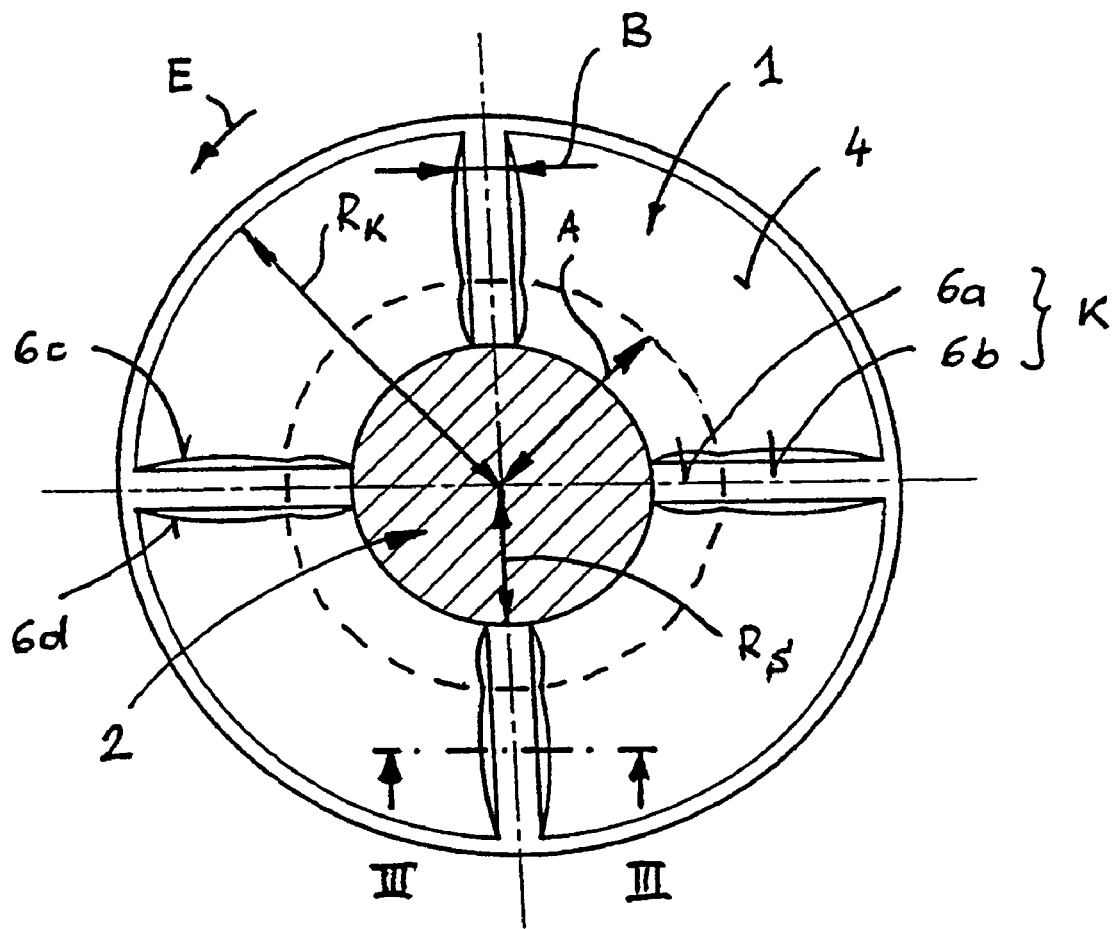
Figure 3:
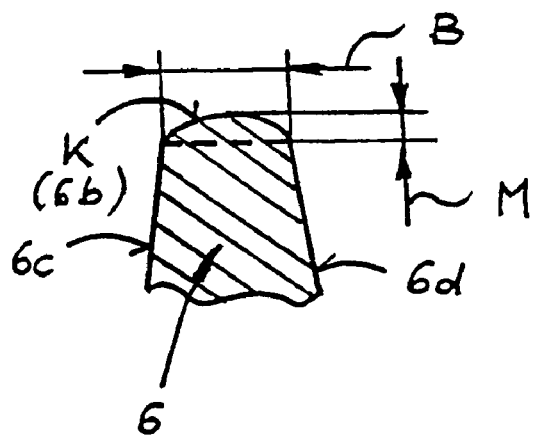

The invention is to be explained in more detail below with reference to the preferred exemplary embodiment shown in the drawing, in which:

FIG. 1 shows an enlarged representation of a countersunk head screw according to the invention in the front view, FIG. 2 shows the countersunk head screw according to the invention in the view sectioned along line II-II in FIG. 1, FIG. 3 shows a partial section through a special embodiment of a friction rib of the countersunk head screw according to the invention in a view sectioned along line III-III in FIG. 2.

The same parts are provided with the same reference numerals in the different figures of the drawing, so that, as a rule, they are also described only once in each case.

As the drawings show, a countersunk head screw according to the invention has a head 1, a shank 2 and a thread 3 extending at least partially over the shank 2. The head 1 has a bearing surface 4 narrowing in the direction of the shank 2. In addition, the head 1 has a basic contour 5 which converges at a first angle $\alpha$ in a first head section 5a remote from the shank 2 and at a second, smaller angle $\beta$ in a second head section 5b facing the shank 2. In this case, the first angle $\alpha$ can preferably be about 90° and the second angle $\beta$ can preferably be about 40° to 60°. This achieves the effect that, despite a relatively narrow shape of the head 1, there is sufficient space in the head 1 for a cross recess (not designated in any more detail and depicted in FIG. 1 by broken lines) for the engagement of a screwdriver.

Friction ribs 6, which extend over the two head sections 5a, 5b, are arranged in the region of the bearing surface 4. With their outer edges K, the fiction ribs 6 essentially follow the converging basic contour 5 of the head 1. As a result, in each case a first edge section 6a, lying in the region of the first head section 5a, and a second edge section 6b, lying in the region of the second head section 5b, of the outer edges K of the friction ribs 6 enclose an obtuse angle $\gamma$ with one another, which promotes easy axial penetration of the screw into the material. The bearing surface 4 is set back radially in the direction of the shank relative to the converging basic contour 5 of the head 1, as a result of which the material displacement is minimized when the screw is being screwed in. In the process, the presence of the friction ribs 6 ensures a high planar moment of inertia of the cross section of the head 1 and thus the requisite torsional strength of the screw.

In the embodiment shown, four friction ribs 6 are provided, but more than or less than four may be provided, for example three, six, eight or more. The desired effect occurring when the countersunk head screw according to the invention is being screwed in can be set gradually and thus adapted to the material by the number and design of the friction ribs 6.

With regard to its axial length $H_B$, the first head section 5a, in which the first edge section 6a of the friction rigs 6 are arranged, should not be greater than about 60 percent of an axial length $H_A$ of the bearing surface 4. Likewise, with regard to its axial length $H_C$, the second head section 5b, in which the second edge section 6b of the friction ribs 6 is arranged, should also not be greater than about 60 percent of an axial length $H_A$ of the bearing surface 4. By such matching of the axial lengths $H_B$, $H_C$ of the individual edge sections 6a, 6b of the bearing surface 4 to one another and to the entire axial length $H_A$ of the bearing surface 4, a differentiated screw-in behavior can advantageously be achieved, depending on how far a countersunk head screw according to the invention has already been screwed in.

As shown, the friction ribs 6, with regard to their longitudinal extent $L_R$, may run on generating lines of the bearing surface 4, the projection P of which falls onto a section, running through the head 1, of the screw longitudinal axis X-X of the screw according to the invention. In this way, the friction effect which the ribs 6 exert on the material is especially large.

The thread 3 has a thread edge 7 which, in a main region, runs in the form of a helical line at a constant distance (outer radius A of the thread 3) from a section, running through the shank 2, of the screw longitudinal axis X-X. In this case, the thread edge 7 may have a decreasing height $H_K$ in an end region 8 of the thread 3 facing the head 1.

The first edge section 6a of the friction ribs 6, in each case in an optimum arrangement with regard to the friction ribs 6 coming into effect—as seen in the bottom view or in the outside approximately by the outer radius $R_K$ of the head 1 and on the inside approximately by the outer radius A.

The second edge section 6b of the friction ribs 6, in each case in an optimum arrangement with regard to the friction rigs 6 coming into effect—as seen in the bottom view or in the sectional representation shown in FIG. 2—may extend in an annular region which is defined on the outside approximately by the outer radius A of the thread 3 and on the inside approximately by the outer radius $R_S$ of the shank 2 at the transition to the second head region 5b.

As a result, the vertex of the obtuse angle γ between the two edge sections 6a, 6b of the friction ribs 6 lies in each case approximately on the outer radius A of the thread 3.

In addition, it is advantageous in this case if the bearing surface 4 is set back relative to the basic contour 5 of the head 1 over the longitudinal extent $L_R$ of the friction ribs 6 by a variable height $H_R$ defined in particular by an arc of a circle having the radius R. In this way, for example, as shown, the height $H_R$ of the outer edges K of the friction ribs 6 increases—starting from a value of zero relative to the bearing surface 4—at least in regions of the first head section 5a and decreases at least in regions of the second head section 5b in order to end again at a value of zero relative to the bearing surface 4. In this case, a maximum value of the height $H_R$ of the friction ribs 6 relative to the bearing surface 4, in particular at an outer radius $R_K$ of the head 1 of about 4 to 5 mm, may preferably be about 0.3 to 0.7 mm.

The friction ribs 6 are optimally designed if, as the drawing illustrates, they each have two side faces 6c, 6d which are designed in particular to be symmetrical to one another and are each of convex shape in each of the head sections 5a, 5b (FIG. 2). In this case, due to the symmetrical design of the friction ribs 6, approximately the same effect occurs both when screwing in the screw-in direction E and when unscrewing the countersunk head screw according to the invention against the screw-in direction E.

The strength-stabilizing effect of the friction ribs 6 is influenced in a positive manner especially when, as likewise shown, the outer edges K of the friction ribs 6 are formed by edge surfaces (width B), adjoining which are the side faces 6c, 6d. In this case, the width B of the edge surfaces, in particular at the outer radius $R_K$, already mentioned by way of example, of the head 1 of about 4 to 5 mm, may advantageously be about 0.3 mm to 0.7 mm.

The invention is not restricted to the exemplary embodiment as described above, but also includes all the embodiments having the same effect within the scope of the invention. For example, the number, shape and arrangement of the friction ribs 6 may differ from the embodiment described. Thus, it may be appropriate for the friction ribs 6, with regard to their longitudinal extent $L_R$, not to run as shown on generating lines of the bearing surface 4, the projection P of which falls onto a section, running through the head 1, of the screw longitudinal axis X-X of the screw according to the invention, but rather to lie (line the thread 3) on a helical path running at least partly in the circumferential direction.

It may also be advantageous if, as additionally shown in FIG. 3, at least some friction ribs 6, in particular in their first edge section 6a, project outward (as viewed from the shank 2) relative to the basic contour 5 (converging as described, and indicated in FIG. 3 by a broken line) of the head 1 by an oversize M formed, for example, by radiusing. As a result, a braking effect occurs in the last screw-in region of the countersunk head screw according to the invention, a factor which may be of importance, in particular in the case of short screws, such as screws for fittings for example, when using mechanical screwdrivers, since this prevents the screw from turning, that is to say from turning on the spot, without penetrating deeper into the material, once they have been screwed in completely or almost completely, and prevents the thread turns formed or cut in the material from being destroyed. In this case, the oversize M of the edge section 6a may be advantageously selected such that it is only small, so that, after the screwing-in, it is virtually pressed flat by the surface pressure with the material into which the screw is screwed.

The bearing surface 4 may also be set back relative to the basic contour 5 of the head 1 over the longitudinal extent $L_R$ of the friction ribs 6 in a different way from that shown. An arc of an ellipse, a parabola or a biconical contour (like that of the edge sections 6a, 6b, but with appropriately different convergence angles) may also take the place of the arc of a circle (FIG. 1).

Furthermore, the invention is not restricted to the combination of features defined in claim 1, but may also be defined by any other desired combination of all the individual features disclosed in heir entirety. This means that, in principle, virtually any individual feature of claim 1 may be omitted or replaced by at least one feature disclosed elsewhere in the application. In this respect, claim 1 is to be understood merely as a first attempt at defining the invention.

| List of designations | |
|---|---|
| 1 | Head |
| 2 | Shank |
| 3 | Thread |
| 4 | Bearing surface of 1 |
| 5 | Basic contour of 1 |
| 5a | First head section 1 (angle α) |
| 5b | Second head section 1 (angle β) |
| 6 | Friction rib |
| 6a | First edge section of K |
| 6b | Second edge section of K |
| 6c, 6d | Side faces of 6 |
| 7 | Thread edge of 3 |
| 8 | End region of 3 |
| A | Outer radius of 3 (distance from 7 to X-X) |
| B | Width of K |
| E | Screw-in direction |
| $H_A$ | Axial length of 4 |
| $H_B$ | Axial length of 5a |
| $H_C$ | Axial length of 5b |
| $H_K$ | Height of 7 |
| $H_R$ | Height of 6 |
| K | Outer edge of 6 |
| $L_R$ | Longitudinal extent of 6 |
| M | Oversize of 6a |
| P | Projection of 6 |
| R | Radius |
| $R_K$ | Outer radius of 1 |
| $R_S$ | Radius of 2 at 5b |
| X-X | Screw longitudinal axis (through 1 and 2) |
| α | Convergence angle of 5a |
| β | Convergence angle of 5b |
| γ | Angle between 6a and 6b |

The invention claimed is:

1. A countersunk head screw comprising:
a head (1), a shank (2) and a thread (3) extending at least partly over the shank (2);
the head (1) having a bearing surface (4), narrowing in the direction of the shank (2);

the head having a first head section (5a) which converges at a first angle (α) remote from the shank (2) and a second head section (5b) which converges at a second angle (β) facing the shank (2), the first head section (5a) and second head section (5b) forming a basic contour (5);

friction ribs (6) protruding entirely from the bearing surface (4), the friction ribs (6) extending from the first and second head sections (5a, 5b) and, with outer edges (K) of the friction ribs (6), follow the converging basic contour (5) of the head (1), with a first edge section (6a), lying in the region of the first head section (5a), and a second edge section (6b), lying in the region of the second head section (5b), of the outer edges (K) of the friction ribs (6) which enclose an obtuse angle (γ) with one another, the bearing surface (4) is set back radially in the direction of the shank (2) relative to the converging basic contour (5) of the head (1), the friction ribs (6) each have two side faces (6c, 6d) which are designed in particular to be symmetrical to one another and are each of convex in shape in each of the head sections (5a, 5b), wherein the friction ribs (6) run in a generally longitudinal direction, and wherein the side faces (6c, 6d) of the friction ribs (6) have the convex shape relative to the longitudinal direction.

2. The countersunk head screw as claimed in claim 1, wherein the first angle (α) is about 90° and the second angle (β) is about 40° to 60°.

3. The countersunk head screw as claimed in claim 1 further comprising that, with regard to the axial length ($H_B$) of the first head section (5a), in which the first edge section (6a) of the friction ribs (6) are arranged, is not greater than about 60 percent of an axial length ($H_A$) of the bearing surface (4).

4. The countersunk head screw as claimed in claim 1 comprising that, with regard to the axial length ($H_C$) of the second head section (5b), in which the second edge section (6b) of the friction ribs (6) is arranged, is not greater than about 60 percent of the axial length ($H_A$) of the bearing surface (4).

5. The countersunk head screw as claimed in claim 1 comprising that, the longitudinal extent ($L_R$) of the friction ribs (6) run on generating lines of the bearing surface (4), the projection (P) of which falls onto a section running through the head (1), of the screw longitudinal axis.

6. The countersunk head screw as claimed in claim 1, comprising that the thread (3) has a thread edge (7) which runs with a constant outer radius (A), at least in sections, over the shank (2), the first edge section (6a) of the friction ribs (6) being arranged in an annular region which, as seen in bottom view, is defined on the outside approximately by an outer radius ($R_K$) of the head (1) and on the inside approximately by the outer radius (A).

7. The countersunk head screw as claimed in claim 1, comprising that the thread (3) has a thread edge (7) which runs with a constant outer radius (A), at least in sections, over the shank (2), the second edge section (6b) of the friction ribs (6) being arranged in an annular region which, as seen in a bottom view, is defined on the outside approximately by the outer radius (A) of the thread (3) and on the inside approximately by an outer radius ($R_S$) of the shank (2).

8. The countersunk head screw as claimed in claim 1, comprising that the outer edges (K) of the friction ribs (6) are formed by edge surfaces (width B), adjoining which are the side faces (6c, 6d).

9. The countersunk head screw as claimed in claim 8, comprising that the width (B) of the edge surfaces (width B) is about 0.3 mm to 0.7 mm.

10. The countersunk head screw as claimed in claim 1, comprising that the bearing surface (4) is set back relative to the basic contour (5) of the head (1) over the longitudinal extent ($L_R$) of the friction ribs (6) by a variable height ($H_R$) defined in particular by an arc of a circle (radius R).

11. The countersunk head screw as claimed in claim 1, comprising that the outer edges (K) of the friction ribs (6) over the longitudinal extent ($L_R$) of the friction ribs (6) increases from a value of zero relative to the bearing surface (4) at least in regions of the first head section (5a) and decreases at least in regions of the second head section (5b) and ends at a value of zero relative to the bearing surface (4).

12. The countersunk head screw as claimed in claim 1, comprising that a maximum value of a/the height ($H_R$) of the friction ribs (6) relative to the bearing surface (4), in particular at an outer radius ($R_X$) of the head (1) of about 4 to 5 mm, is about 0.3 to 0.7 mm.

13. The countersunk head screw as claimed in claim 1, further comprising two to eight friction ribs (6).

14. The countersunk head screw as claimed in claim 1, wherein at least a portion of the friction ribs (6) project outward in their first edge section (6a) relative to the basic contour (5) of the head (1) by an oversize M as viewed from the shank (2).

* * * * *